Dec. 21, 1965   W. SCHEFFELS   3,225,248
DEVICE FOR PRODUCING A HIGH-INTENSITY BEAM
OF CHARGE CARRIERS OF SMALL APERTURE
Filed May 22, 1962

PRIOR ART

3,225,248
DEVICE FOR PRODUCING A HIGH-INTENSITY BEAM OF CHARGE CARRIERS OF SMALL APERTURE
Wilhelm Scheffels, Aalen, Wurttemberg, Germany, assignor, by mesne assignments, to United Aircraft Corporation, East Hartford, Conn., a corporation of Delaware
Filed May 22, 1962, Ser. No. 196,802
Claims priority, application Germany, May 27, 1961, Z 8,773
1 Claim. (Cl. 315—31)

This invention relates to a source for producing a high-intensity beam of charged particles of small aperture.

In the production of a high-intensity beam of charge carriers by means of a beam generating system consisting of a hot cathode, anode and control electrode, the field strength at the electron-emitting cathode surface, the current density of the electron emission, and the size of the emitting cathode surface, as well as the lens action of the accelerating field in the immediate vicinity of the cathode are important factors. All of these factors, together, have the result that the first cross-over point, i.e. the place of smallest beam cross-section, occurs in a region where the cathode field no longer exerts its strong collecting action. This means that the aperture of an emerging beam of charge carriers of high beam current intensity is so large behind the anode that upon a focusing of this beam for the purpose of a reduced imaging of the crossover by means of normal electron lenses, the aperture defect thereof is of too great a relative value.

In the so-called tele-focus cathode, the control electrode is specially constructed so that the focus of the beam generating system lies behind the anode. This tele-focus cathode, however, has the disadvantage that without the introduction of additional auxiliary electrodes, the focal length depends greatly on the emission, i.e. that the position of the focus changes upon a change in the control electrode bias voltage. Another disadvantage of the tele-focus cathode is that the field strength at the cathode cannot be made very large, with the result that in many cases the current density per unit solid angle (Richtstrahlwert) is limited by the space charge.

It is, therefore, an object of the present invention to provide a source for producing a high-intensity beam of charge particles of small aperture the focal length of which does not depend on the emission.

In accordance with this object, there is provided, in a preferred embodiment of this invention, a beam generating system consisting of hot cathode, control electrode and anode, in which the cathode region serving for the emission lies in a magnetic field of variable intensity which exerts in the direction of the beam a collecting action on the emitted charge carriers. By this magnetic field in the vicinity of the cathode, the collecting action of the cathode field is increased. In the case of beam generating systems of customary construction in which the first cross-over point of the charge carriers lies normally between cathode and anode, this point is thereby brought closer to the cathode. In this way, the cathode field still exercises a strong collecting action even behind the first cross-over point and produces a second cross-over point which lies, for example, beyond the anode. By selecting the intensity of the magnetic field, this second cross-over point can be displaced as desired along the axis of the beam.

The new arrangement can also be used in connection with the known tele-focus cathodes. In this case, the magnetic field is able to regulate the position of the first cross-over point or maintain it constant independently of the emission.

In the arrangement, the field strength at the anode can be maintained very large so that one can obtain a current density per unit solid angle which is close to the maximum obtainable value.

By means of the new arrangement, there is produced a high-intensity beam of charge carriers in which the position of the cross-over point can be selected as desired. For example, with constant beam current, the cross-over point can be displaced in a simple manner along the direction of the axis of the beam, or with variable beam current, the position of the cross-over point can be held at a predetermined position.

In the new arrangement, the collecting magnetic field is superimposed on the cathode field. Thus the magnetic field acts on the charged particles when the particles are at low velocity and have not been accelerated to a high velocity. For this reason, the collecting magnetic field can be maintained relatively weak.

It is also possible to select the intensity of the collecting magnetic field in such a manner that no real second cross-over point occurs but that the second cross-over point is a virtual cross-over point behind the cathode. In this way, it is possible to produce a beam of particularly small aperture, which may be advantageous for specific fields of use (for example, working of material with a beam of charge carriers).

In order to produce the collecting magnetic field, the hot cathode can advisedly be surrounded by a current-carrying coil which lies at the cathode potential. In this connection, it is advantageous to connect the cathode and the coil in series with respect to their current supply. Upon a small change in the heating current, the magnetic field will in such case already have its intensity noticeably changed while the change in the heating current will be practically without influence on the emission of the cathode, particularly if the cathode operates in space-charge operation.

It may also be advantageous to provide for the production of the magnetic field, means connected with the control electrode and lying at the potential of the control electrode. The means for producing the magnetic field consists in this connection advisedly of an electromagnetic lens, the one pole shoe of which is formed of a part of the control electrode which is closest to the cathode.

In many cases, it may also be advantageous to provide for the production of the magnetic field an electromagnetic lens, the one pole shoe of which forms the anode of the beam generating system.

If an electromagnetic lens is used to produce the collecting magnetic field, it may be advantageous to provide a ferromagnetic insert arranged in the immediate vicinity of the cathode, and lying at a different potential than the electromagnetic lens itself, said insert being separated by air or vacuum gap from the pole shoes of the electromagnetic lens. By this insert, the result is obtained that the collecting magnetic field is amplified in the vicinity of the cathode.

Instead of the electromagnetic lens, permanent magnets which are variable in their intensity can also be provided.

The need for maximum field strength at the cathode with a very high emission density is best fulfilled by a heated point cathode. With such cathode, however, there is normally the disadvantage that the electrons emerge at an unusually large space angle. When using this cathode, and particularly when working with pulse operation, one obtains high current intensities, but the aperture of the emerging beam of electrons behind the anode is excessively large.

By means of the new arrangement, this previously existing disadvantage of the heated point electrode is avoided. In an arrangement in which the beam generating system consists of a heated point cathode and an electrode arranged in the immediate vicinity of said cathode and at a potential positive with respect to it, this electrode is preferably, in accordance with the present invention, developed simultaneously as pole shoe of an electromagnetic lens surrounding the cathode. The electrons emerging from the point cathode are collected by the magnetic field produced by this lens. In this way, it becomes possible to produce an electron beam of small aperture with a point electrode.

The invention will be described in further detail below, with reference to the embodiments shown in FIGS. 1 to 5 of the drawing, of which:

Figure 1:
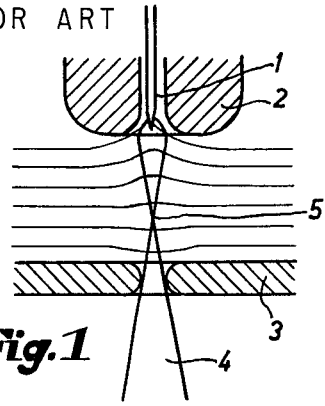
FIG. 1 is a cross sectioned view of a beam generating system in accordance with the prior art.

Referring to FIG. 1, there is shown a beam source according to the prior art which comprises a hot cathode 1, modulator electrode 2 and anode 3. If the characteristics of this beam generating system are so selected that a high-intensity electron beam is produced, the electron beam 4 emerging from the anode 3 will have a very large aperture.

As can be noted from FIG. 1, the first cross-over point 5 is produced between cathode and anode in a region where the cathode field no longer has a strong collecting or condensing action due to the field distribution and the velocity of the electrons. For this reason, the aperture (i.e. the angular definition of the ray cone) is large in case of a high beam current of the electron beam 4.

Figure 2:
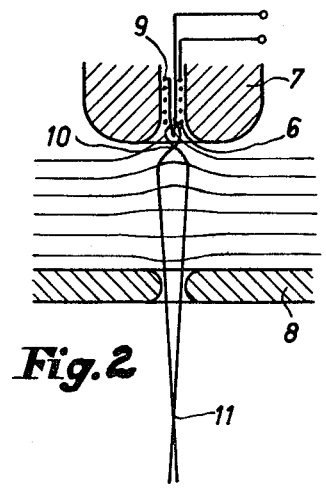
FIG. 2 is a cross section view of a beam generating system constructed in accordance with the invention.

In FIG. 2, there is shown a beam generating system in accordance with the present invention which comprises a heated source electrode or cathode 6, modulating or control electrode 7 and an accelerating electrode or anode 8. The cathode 6 is surrounded by a current-carrying coil 9 which is at cathode potential. This coil is connected in series with the cathode so that the current flow therethrough is utilized both for cathode heating and for establishment of a magnetic field by the coil. A small change in the heating current causes a significant change of the magnetic field of the coil 9, however, the emission of the cathode 6 is changed only to a scarcely perceptible extent with small changes of heater current. Thus, the field can be regulated without disturbing the emission characteristics of the cathode by regulation of the current flow through the coil. The magnetic field generated by coil 9 exerts a strong collecting or condensing action on the electrons at the hot cathode 6 where the electron velocity is low. Thus, the magnetic field augments the collecting action of the cathode field in the vicinity of the cathode. In this way, the first cross-over point 10 is produced in the immediate vicinity of the hot cathode 6, i.e. in a region of the cathode field in which the latter exerts a strong collecting action. As a result of this action of the cathode field, the electrons are again collected behind the first cross-over point 10 and there is produced a second cross-over point 11, located behind the anode 8 as seen in the direction of the beam.

By varying the current flowing through the coil 9, the collecting magnetic field in the vicinity of the cathode is changed. In this way, the location of the first cross-over point 10 is displaced along the axis of the beam so that also the location of the second cross-over point is displaced along the axis of the beam.

Figure 3:
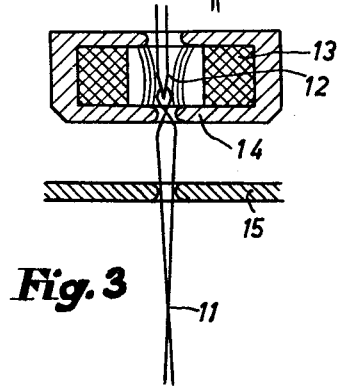
FIG. 3 is a cross sectioned view of another embodiment of the present invention.

In the embodiment shown in FIG. 3, the hot cathode 12 is surrounded by an electromagnetic lens 13, one pole shoe 14 of which is developed as control electrode. Accordingly, the lens 13 is at the potential of the control electrode. The lens 13 produces a collecting magnetic field so that, in the same manner as explained in connection with the source shown in FIG. 2, a second cross-over point 11 of the electrons is produced lying behind the anode 15, as seen in the direction of the beam.

Figure 4:
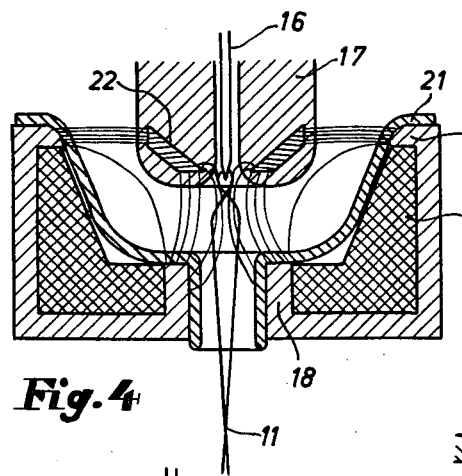
FIG. 4 is a cross sectioned view of still another embodiment of the present invention in which the means for producing the collecting magnetic field are connected with the anode.

FIG. 4 shows a further embodiment in which the heated cathode is designated 16, the modulating electrode 17 and the anode 21. The anode consists of a thin plate of non-magnetic or only slightly magnetic material, which covers the electromagnetic lens 19. The pole shoe 18 of this lens, together with the masking plate 21 serves directly as anode, i.e., the lens 19 is at anode potential. The other pole shoe 20 of the lens 19 is separated by an air gap from the ferromagnetic insert 22 and the control cylinder 17. The insert 22 is at the potential of the control cylinder 17.

By means of the insert 22, the result is obtained that the collecting magnetic field is amplified in the vicinity of the hot cathode 16, as illustrated by the flux lines.

In the embodiment shown in FIG. 4, the first cross-over point is produced in the vicinity of the hot cathode 16 by the collecting magnetic field. A second cross-over point 11 is produced behind the anode 18 as seen in the direction of the beam.

Figure 5:
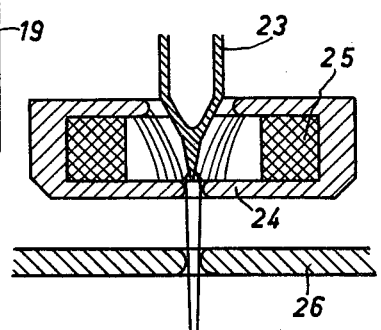
FIG. 5 is a cross sectioned view of a beam generating system in accordance with the present invention using a heated point cathode.

FIG. 5 shows a beam generating system which consists of a heated point cathode 23 which is at negative potential. In the direct vicinity of this point cathode, there is arranged an electrode 24, which is at positive potential with respect to the cathode and forms a pole shoe of the electromagnetic lens 25. The anode, which is at positive potential with respect to the point cathode 23 is designated 26. The emission current is controlled here by variation of the temperature of the cathode by means of the heating current.

The electromagnetic lens 25 surrounds the region of the point cathode 23 serving for the emission and produces in this region a magnetic field which collects the electrons emerging at a large space angle from the cathode 23. Accordingly, there is produced a real cross-over point 27 located behind the anode, viewed in the direction of the beam.

It is also possible to replace the electromagnetic lens shown in FIGS. 3 to 5 by permanent magnets of variable strength.

This invention may be variously embodied and modified within the scope of the subjoined claim.

What is claimed is:

A source for the generation of a high-intensity narrow angle electron beam comprising a heated cathode for the emission of electrons, an anode having an aperture therein, said anode being positioned at a distance from said cathode and strongly biased positively with respect to said cathode to accelerate the emitted electrons toward said anode and to pass the accelerated electrons through said aperture in a high-intensity beam, a cylindrical modular electrode surrounding said cathode to modulate beam emission, and means to establish a magnetic focusing field within said modulator electrode to coact with the emitted electrons before substantial acceleration thereof by said acceleration field and to concentrate said emitted electrons into a narrow angle beam, said field establishing means comprises a coil surrounding said cathode, said cathode being serially coupled with said coil so that current flow therethrough is utilized both for cathode heating and for the establishment of said magnetic field.

References Cited by the Examiner

UNITED STATES PATENTS

| | | | |
|---|---|---|---|
| 2,188,579 | 1/1940 | Schlesinger | 313—84.5 |
| 2,221,743 | 11/1940 | Wagner | 313—86 |
| 2,806,978 | 9/1957 | Hurford et al. | 313—84.5 |
| 3,141,988 | 7/1964 | Murphy | 313—84 |

FOREIGN PATENTS 603,939   6/1948   Great Britain.

ROBERT SEGAL, *Primary Examiner.*